United States Patent [19]

Menzel et al.

[11] 4,337,564

[45] Jul. 6, 1982

[54] MACHINE AND METHOD FOR FORMING TUBES FROM A STRIP

[75] Inventors: Stanley W. O. Menzel, Adelaide, Australia; David E. Mominee, Alpine; Gilbert W. Vance, Jamul, both of Calif.

[73] Assignee: Rib Loc Hong Kong Limited, Hong Kong, Hong Kong

[21] Appl. No.: 80,044

[22] Filed: Sep. 28, 1979

[51] Int. Cl.³ .............................................. B23P 11/02
[52] U.S. Cl. ......................................... 29/453; 72/50; 138/135
[58] Field of Search ............... 29/453, 157.3 AH, 235; 138/135, 136, 154, 122; 72/49, 50

[56] References Cited

U.S. PATENT DOCUMENTS

| | | | |
|---|---|---|---|
| 3,532,580 | 10/1970 | Kanao | |
| 3,865,146 | 2/1975 | Meserole | 138/173 |
| 3,938,558 | 2/1976 | Anderson | 138/135 |
| 4,029,129 | 6/1977 | Harper | 138/135 |
| 4,058,997 | 11/1977 | Siegwart | 72/50 |

Primary Examiner—James L. Jones, Jr.
Attorney, Agent, or Firm—Gordon L. Peterson

[57] ABSTRACT

The method of forming tubes from strip in which a complementary rib and groove are spaced apart to each extend longitudinally on the strip and oppositely facing on the said strip characterized by guiding the strip into a helical configuration to overlap the edges of the said strip, and pressing together the overlapping parts of the said strip while maintaining a differential pressure in the direction of feed to force the strip together under such differential pressure.

26 Claims, 15 Drawing Figures

MACHINE AND METHOD FOR FORMING TUBES FROM A STRIP

FIELD OF THE INVENTION

This invention relates to a machine for forming tubes from strip and in particular it relates to a machine of the type into which a strip of a selected width is fed and is then curved around in a helical fashion and the edges of the strip are joined together by any suitable means, this operation continuing until the required length of tube has been achieved.

THE PRIOR ART

It is known to form tubes in this way and reference may be had to U.S. Pat. No. 3,199,541 of C. G. Richitelli in which one edge of the strip has a socket formation and the other edge of the strip has a bead formation so that when the strip is fed back on itself in a helical fashion the bead can be pushed into the socket to join the two edges together and thus form a continuous tube.

It is also known to provide machines for effecting the helical winding and as an example of such a machine we refer to U.S. Pat. No. 3,606,670 in the name of M. Wienand et al which uses a mandrel onto which the strip is held by means of rollers, the rollers being shaped to align and press together the two complementary edges of a strip when helically wound on such a mandrel.

Another such machine is shown in U.S. Pat. No. 3,938,558 in the name of Leroy Anderson, which machine uses a series of rollers which progressively corrugates a strip of metal starting at the centre and gradually corrugating outwards and then winds the corrugated strip to helical form and forms a seam to join the contiguous edges to form a tube, the rollers which form the seam being disposed on both sides of the strip at the point of contact of the strip as it is fed in.

A seam is first formed between contiguous edges of the strip and the strip is then curved to tubular form by further rollers positioned around the circumference of the tube.

A still further patent for forming metal strip into tubes is U.S. Pat. No. 3,621,884 in the name of John M. Trihey which again shapes a strip to a required corrugated form and then forms a seam between contiguous edges of the strip by shaping and pressing together the edges to interlock.

OBJECTS OF THE INVENTION

It is an object of the invention to provide an improved method of tube formation in which a preformed strip, preferably extruded from a plastic, is helically wound and the convolutions joined together to form a tube, a further object being to provide a close control of the way the strip is bent and the convolutions interlocked to produce either a tube of uniform diameter or a tube of variable diameter along its length.

It is also an object of the present invention to provide certain improvements to machines of that type which form strip into tubular form by helically winding the strip.

It is a still further object to provide means whereby the strip, as the contiguous edges of helical convolutions of the strip are being joined, is given the required shape and curvature.

It is a still further object to provide a machine in which the diameter of the helical tube being formed is variable.

It is a still further object to closely control the diameter of a tube formed in this way and to control this progressively as the tube is being formed so that the dimensions of the tube can be varied progressively in any required manner as the tube is being formed.

SUMMARY OF THE INVENTION

The method of forming the strip comprises feeding forward a strip having a complementary rib and groove spaced apart on the strip to each extend longitudinally on the strip and oppositely facing, and directing the strip into a helical configuration with the rib in register with the groove after one convolution of the helix whereby to overlap the edges of the strip, and pressing together the overlapping parts of the strip on a joining roller while maintaining a differential feed pressure between that portion of the strip being fed in and that portion of the convolution of the strip which is pressed against the part being fed in at the joining roller.

The machine comprises means to feed the strip forward over the joining roller and to curve the strip into a helical configuration beyond the joining roller and to join the helical convolution of the strip to the feed strip at the joining roller by applying a differential feed pressure to the strip and the convolution at the joining roller.

Thus the joining of the convolution of the strip to that part of the strip which is fed over the joining roller while under differential pressure has the effect of urging the strip into a helical form to give a strong and accurately formed tube.

DESCRIPTION OF THE PREFERRED EMBODIMENT

Referring first to FIGS. 1 to 6 inclusive, the strip 1 is fed forward by a roller 2 driven from a suitable power source such as a hydraulic or electric motor 3, the strip 1 being kept in contact with the roller 2 by the roller 4, at least one of the rollers being resilient to ensure a firm grip and drive for the strip.

Figures 1, 3:
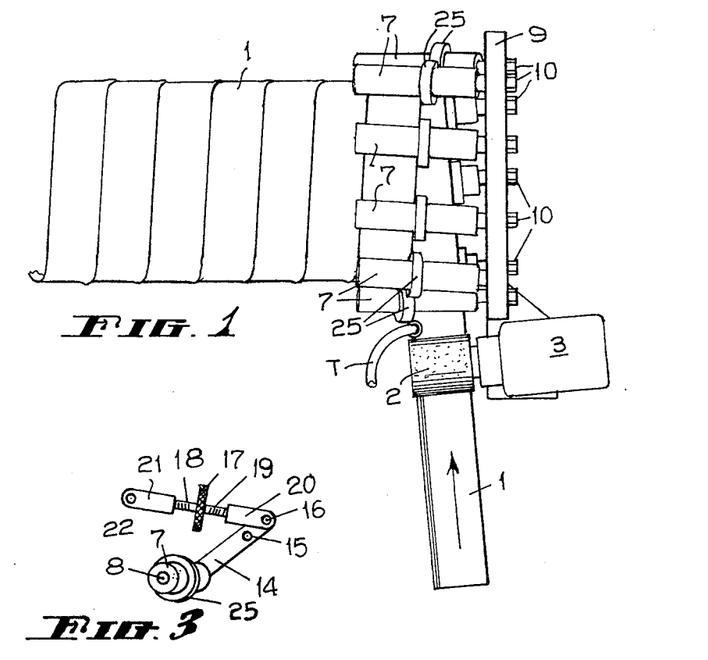
FIG. 1 is a plan of a simple form of machine for winding a strip into helical form.
FIG. 3 is a detail of a modification of the illustrated machine.
Figure 2:
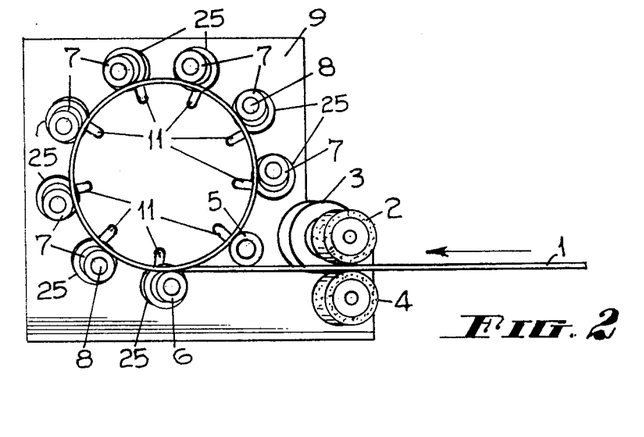
FIG. 2 is an end elevation of the machine illustrated in FIG. 1.

The strip feeds from the rollers 2 and 4 to beneath a guide roller 5 which allows the strip to come into contact with the joining roller 6, from which joining roller 6 the strip passes on in contact with a series of guide rollers 7 positioned around the periphery of the tube which is being formed by the strip, the rollers 5, 6 and 7 being mounted on spindles 8 held to a frame member 9 by nuts 10 on threaded shafts of the spindles, the shafts of the spindles passing through slots 11 in the frame member so that the rollers can be positioned to form tubes of different diameter.

Instead of using the slots 11 in the frame member 9 to vary the position of the spindles 8, each spindle 8, as shown in FIG. 3, can be mounted on one end of an arm 14 connected by a pivot pin 15 to the frame member 9 and variable in angle by the other end of the arm 14 being connected by a pin 16 to an adjusting member 17 having right and left hand screw threaded portions 18 and 19, the one portion 19 engaging in the member 20 which engages the pin 16 while the other portion 18 engages in the member 21 which in turn is connected by a pin 22 to the frame member 9.

In this way, the position of the rollers 7 can be varied to vary the size of the circle around which they are arranged, either individually or by a single adjustment that can move all rollers.

It will be noted that the strip 1 is fed in at an angle to the axis of the tube being formed, see particularly FIG. 1, this being necessary to achieve the required helical formation. To ensure that the strip 1 is correctly positioned helically, the joining roller 6 and the series of rollers 7 each has on it a flange 25, which flanges are preferably movable along the rollers 6 and 7 to allow strips of different width to be used, these flanges 25 engaging one edge of the strip to deflect the strip from the direction in which it is fed to the forming roller 6 to offset the edge so that the required helical formation results, and it will be noted that the series of rollers 7 are themselves angled to correctly position the strip along its helical path. The flange 25 on the joining roller 6 is not always necessary.

Figure 4:
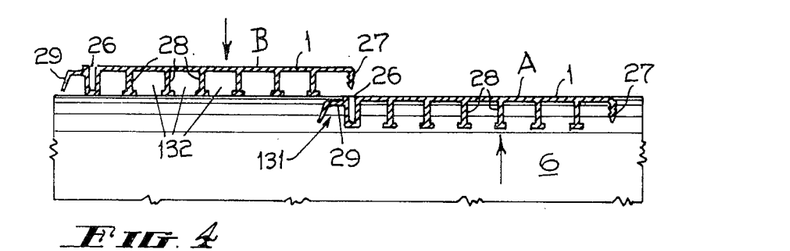
FIG. 4 is a cross section of a strip and joining roller which joins two edge portions of the strip when the strip is being wound to helical form, the section of the strip on the left being taken at the point of roller contact but the section of the strip on the right which is being fed to form a helix being taken forwardly of the roller before the roller has positioned the strip in its interlocking configuration.
Figure 5:
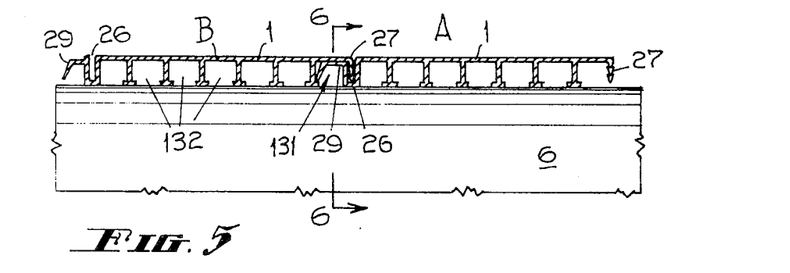
FIG. 5 is a view corresponding to FIG. 4 but showing the edges of the strip interconnected.
Figure 6:
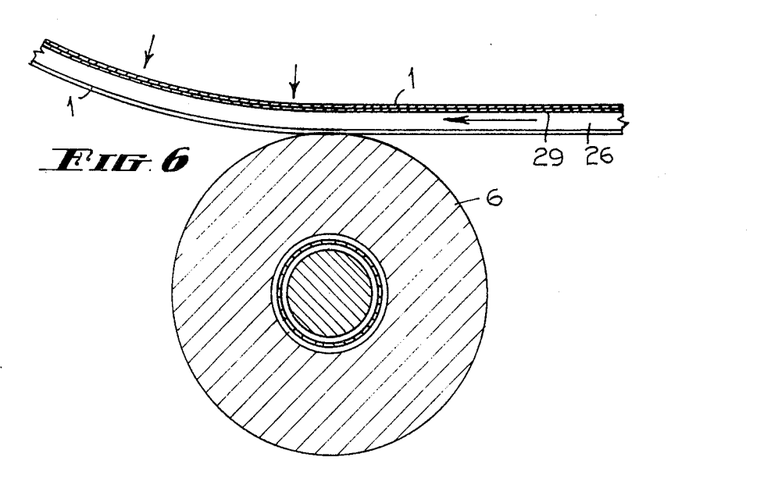
FIG. 6 is a section as on line 6—6 of FIG. 5.

Referring now particularly to FIGS. 4, 5 and 6, it will be noted that the strip 1 has at its one edge portion a socket 26 and at its other edge portion a rib 27 so that, when the strip is helically wound, the rib 27 coincides with the socket 26 at the point of contact with the forming roller 6, the strip also having a series of strengthening ribs 28 and a locking rib 29 according to a configuration for which the machine is specifically adapted, but the strip can, of course, be of other form and need not be limited to the form shown.

In operation the strip is fed forwardly by being gripped between the driving roller 2 and the pressure roller 4 and contacts the joining roller 6 as it is driven forward, the strip passing over the joining roller 6 to contact the first of the series of rollers 7 and so on until the end of the strip, after one convolution, again reaches the forming roller 6 whereupon, because of the tension existing in the strip due to the bend which is imparted to it as it is helically curved, will cause this strip to be forced down onto the roller 6 but, because it has been helically displaced, it will be forced down to cause the rib 27 to engage the socket 26 and by then continuing to feed the strip forward by means of the rollers 2 and 4 a helical tube is progressively formed.

The strip 1 is being forced forward by the rollers 2 and 4 against the resistance of the strip to be curved by the series of rollers 7 and the effect of this is that there is a differential feed pressure on the strip 1 as it is forced into joining contact with the convoluted strip and this pressure so exerted has the effect of giving to the strip a curvature and lock required to form a successful helical tube.

Because of the urging force of the strip 1 to rotate the tube itself a very effective seal is provided so that the rib 27 is firmly engaged in the socket 26 under substantial pressure, and it will be seen for instance from particularly FIG. 4 that the convolution B is forced down onto the joining roller 6 by the force applied as the strip is curved by the series of rollers 7 so that the strip 1 is held very firmly down onto the joining roller 6, and it will be seen also that the part A of the strip which is being fed in onto the roller 6 by the drive roller 2 and pressure roller 4 is pushed by the joining roller into the same plane as that part B of the strip already on the roller.

Figure 7:
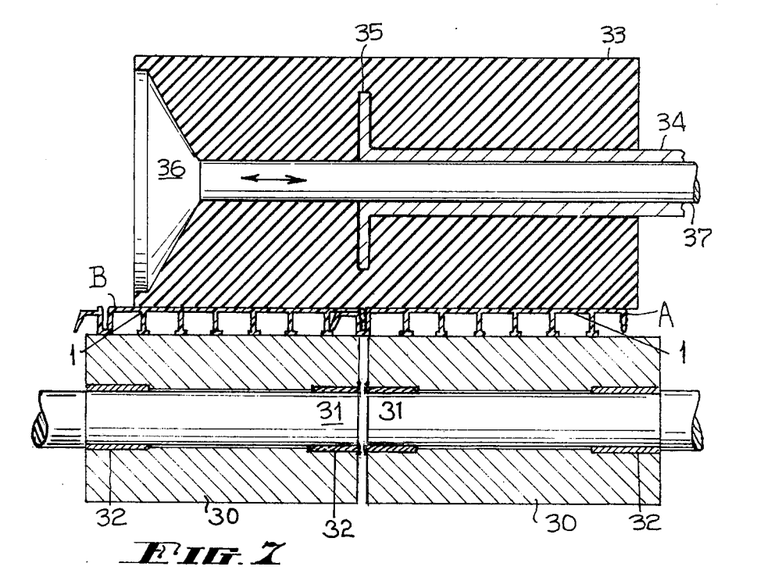
FIG. 7 is a detail of a modified form of joining mechanism comprising a joining roller corresponding to the roller of FIG. 6 but utilizing a driving roller to provide a differential drive for the strip and the first convolution of the tube whereby the required curvature of the strip is achieved to form a tube of a selected and variable diameter.
Figure 8:
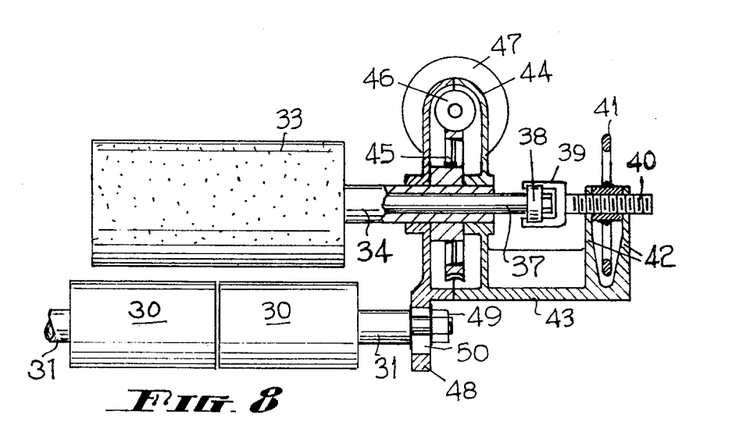
FIG. 8 is a sectional view to reduce scale of the mechanism which controls the drive and the mechanism which regulates the dimension of the strip driving roller.

While in FIGS. 1 to 6 inclusive a form of the invention is shown in which the strip is forced onto the joining roller 6 by the curved configuration of the strip 1 as the forming takes place, it is possible to have a similar stress induced by the embodiment shown for instance in FIGS. 7 and 8, in which dual joining rollers 30 are carried on a spindle 31 by bearings 32 but in this case instead of using the roller 2 which is the driving roller at a position remote from the joining roller 6, the driving roller, in this case numbered 33, is positioned to press onto the dual forming rollers 30 the strip 1 as it is being processed into a tube.

As stated earlier there is a differential pressure between that part of the strip 1 as it is fed into union with that part of the strip which has already been formed into the helix, and to achieve this differential pressure the resilient roller 33 is mounted on a hollow shaft 34 which has a flange 35, to which shaft 34 and flange 35 the roller 33 is firmly bonded, the roller however being longitudinally compressible by means of a pressure member 36 on a shaft 37 which is movable in the hollow of a shaft 34 so that by moving the shaft 37 axially in relation to the shaft 34 that part of the roller between the flange 35 and the pressure member 36 can be varied in dimension, the roller being shown in that Figure with the pressure so applied that the part between the flange 35 and the pressure member 36 is of the same diameter as the part on the other side of the flange 35 but by for instance releasing pressure the part between the flange and the pressure member can be reduced in diameter or by increasing pressure it can be increased in diameter in relation to the part on the other side of the flange.

In this way by varying the diameter of that part of the roller 33 which is pressing down on the part B in the illustration, a different forward rate of motion can be given to the part B of the strip which is already part of a helix, and this causes the parts A and B to slip relative to each other in the joint between them. It has been found in practice that this forms a very convenient way of selecting the size of the tube which is formed by helically winding the strip.

The method of varying the dimensions of the part of the roller 33 between the flange 35 and the pressure member 36 is shown particularly in FIG. 8 and can consist of a thrust bearing 38 engaged by a fork 39 which has on it a threaded stem 40 engaged by a hand wheel 41 which is axially confined between the members 42 of a frame member 43 which as will be seen is connected to a gearbox 44 having in it a worm wheel 45 driven from a worm 46 by a motor 47, the worm wheel 45 being secured to the shaft 34 so that the shaft 34 is both maintained in correct axial position and is driven by the motor 47.

By setting the hand wheel 41 to give the required loading between the flange 35 and the pressure member 36 the required diameter of helical tube is produced.

In this form of the device the righthand portion of the joining roller 30 is shown with its spindle 31 held to the flange 48 by a nut 49 to be adjustable in the slot 50, and the lefthand portion of the roller 30 can be similarly adjustably mounted. However, it will be realised that other forms of adjustment could be used to vary the distance between the roller 33 and the joining roller 30 according to the dimensions of the strip being processed and the diameter of the roller 33.

Figure 9:
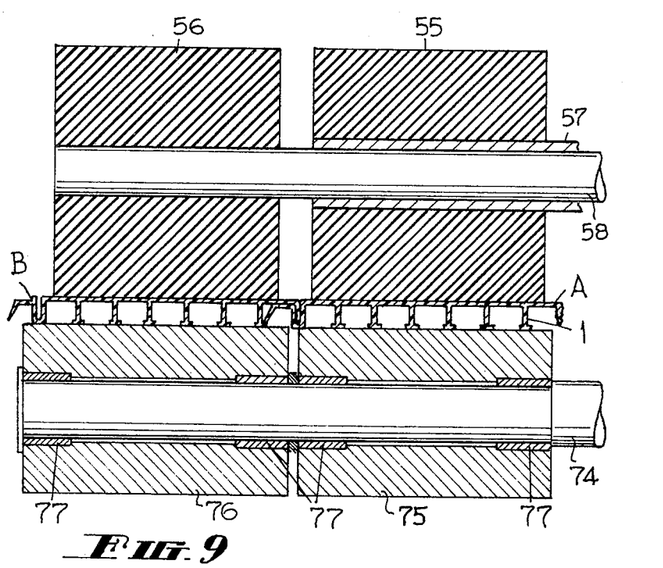
FIG. 9 is a view corresponding to FIG. 7 but using a divided roller to form a pair of driving rollers which can be operated at differential rotation speeds to achieve the differential drive.
Figure 10:
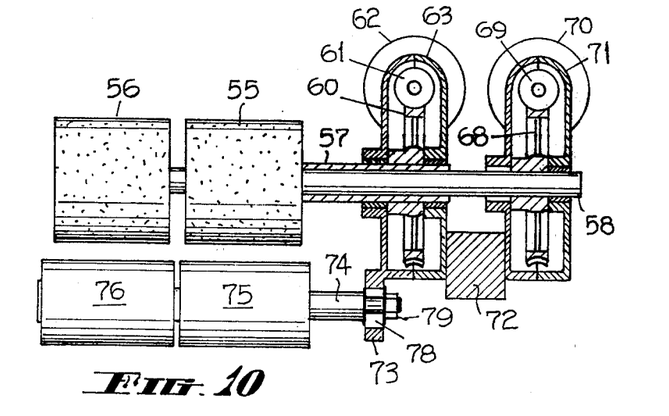
FIG. 10 is a sectional view to a smaller scale showing the drive means for the rollers of FIG. 9.

In FIGS. 9 and 10 is shown a preferred form of device in which instead of using a single roller 33 with part of it variable in diameter, separate resilient rollers 55 and 56 are used, the roller 55 being the main drive roller to feed the strip 1 into the helix while the roller 56 is the roller which controls the rate of revolution of the helical tube being formed, the roller 55 being mounted on a hollow shaft 57 while the roller 56 is mounted on a separate shaft 58.

In this case the hollow shaft 57 is connected to a worm wheel 60 which in turn engages the worm 61 which is driven by a hydraulic or electrical motor 62, the assembly being positioned in the housing 63 which forms a gearbox to drive the roller 55.

The shaft 58 is similarly connected to a worm wheel 68 engaging a worm 69 driven from a motor 70, the housing 71 being attached to a support member 72 to which the gearbox 63 is also attached, the gearbox 63 again having a bracket 73 which supports the shaft 74 of the two forming rollers 75 and 76, which have bearings 77 engaging the shaft 74. The shaft 74 is again positionable in a slot 78 in the bracket 73 so that by loosening the nut 79 the distance between the rollers 75 and 76 and the corresponding rollers 55 and 56 can be selected. Alternatively, the rollers 75 and 76 can be individually mounted and spring loaded.

In the case of this embodiment of course the curvature given to the strip as it is formed into a helix is adjusted by varying the speed of the motors 62 and 70 and it will be realised for instance that the rollers 56 can be driven at a different speed to the roller 55 by varying the speeds of the motors, and this then has the effect of varying the pressure on the part A of the strip 1 as it is fed forward between the rollers 55 and 75 in relation to the speed of that part B of the strip 1 between the rollers 56 and 76, this differential pressure ensuring that while the two overlapping edges of the strip are forced together to engage the rib 27 in the socket 26 one of these parts of the strip is held back relative to the other part of the strip by the differential speed of the rollers 55 and 56 to cause the joined strip to be given a curvature due to the differential pressure existing in the two contiguous parts of the strip 1 being joined.

This again allows the diameter of the helical tube being formed to be varied simply by varying the differential speed of the motors 62 and 70 but the form of the invention now to be described with reference to FIGS. 11, 12, 13 and 14 adds a convenient form of control to the operation of the motors 62 and 70 and allows by a simple adjustment of a hand wheel a variation of the diameters of the tube being formed.

Referring now to FIGS. 11, 12, 13 and 14 it will be seen that again the rollers 55 and 56 are used, driven by the motors 62 and 70 through the gearboxes 63 and 71, but the differential speed can be varied by varying the speed of one of the motors 62 or 70 by means of a sensing roller 85 which is mounted in a fork 86 on a stem 87 which in turn is movable in an arm 88 to actuate a transducer 89 according to the pressure being exerted on the roller 85 by the strip 1, the roller 85 moving outwardly if the diameter of the tube increases and inwardly if the diameter of the tube decreases. To allow this sensing to take place for different diameter tubes, or variable diameter tubes the arm 88 is mounted on a slider 90 on a frame member 91 which supports a threaded shaft 92 confined axially by bearings 93 and 94, the threaded shaft 92 having on it a bevel wheel 95 which meshes with a bevel wheel 96 which in turn is fixed to a shaft 97 having left and right hand threads on it again axially confined in bearings 98 and 99 and having on it a hand wheel 100 so that by rotating the shaft 97 by means of a hand wheel 100 the slider 90 can be moved up and down to fix the position required to produce a tube of a certain diameter, but to avoid distortion of the tube as it is formed the shaft 97 actuates a pair of sliders 102 operating on lateral extensions 103 of the frame member 91 and carrying rollers 104 on brackets 105 so that rotation of the shaft 97 through the bevel wheels 95 and 96 simultaneously moves the rollers 104 either inwards or outwards according to the required diameter, but the sensing roller 85 is moved up and down at a proportional rate to effect the required sensing.

By coupling the transducer 89 to control the speed of one of the motors 62 or 70 it is thus then possible to vary the differential speed to maintain the diameter of the spiral being formed through the sensing roller 85 which changed the speed of the motor according to the position of the roller 85 in relation to the arm 88 which in turn actuates the transducer 89 to either increase or decrease the speed of the relevant motor to maintain the correct curvature of the strip 1.

Figures 11, 12:
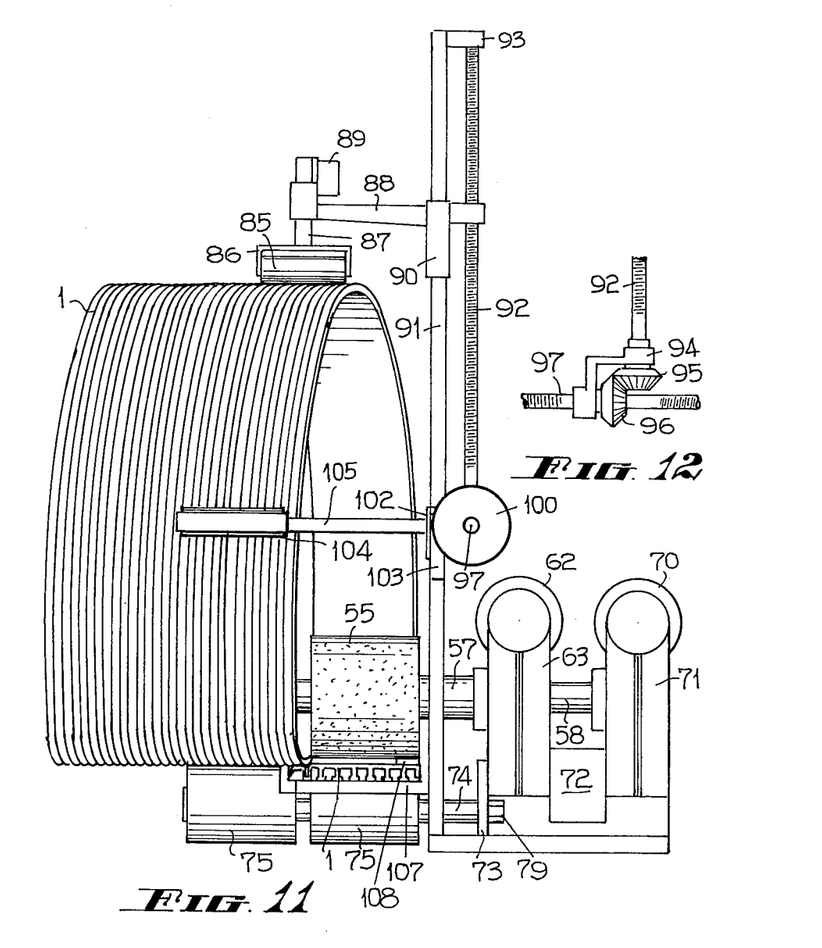
FIG. 11 is a view showing a helical pipe being formed by the mechanism illustrated in FIGS. 9 and 10 but showing means whereby the diameter of the tube can be progressively varied as the tube is produced.
FIG. 12 is a detail of the adjusting mechanism of FIG. 11.
Figure 13:
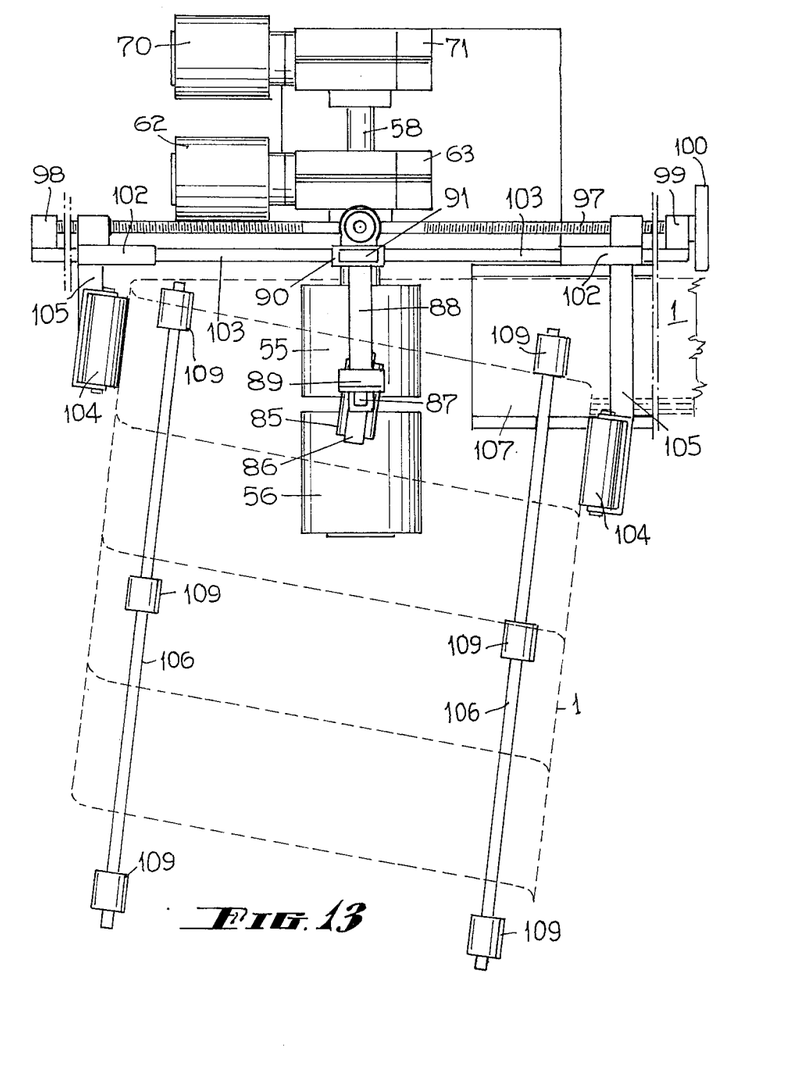
FIG. 13 is a plan of the machine shown in FIG. 11, but showing the strip and tube in dotted lines.
Figure 14:
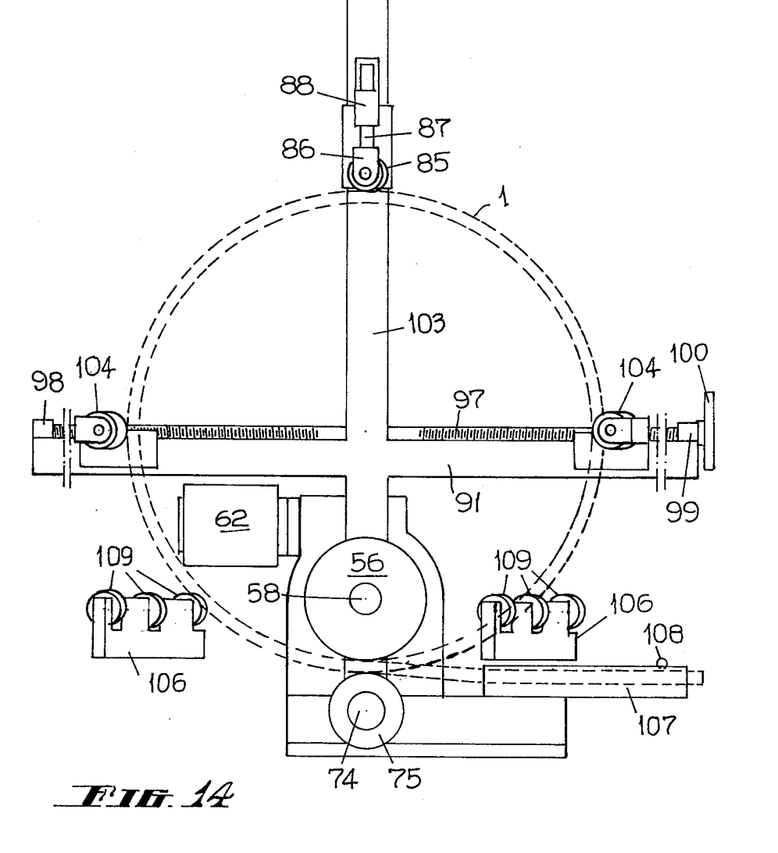
FIG. 14 is an end elevation of the machine shown in FIG. 11 again showing the strip and tube in dotted lines.

The strip 1 actually is fed in by means of a guide 107 which is shaped to feed the strip correctly to the roller 55 and this guide has on it rollers or pins 108 which confine the strip correctly within the guide 107 but allowed to be drawn forward by the roller 55 at the correct speed to be forced into contact with the rollers 55 and 75.

In this way if for instance the diameter of the tube is to be increased the hand wheel 100 is simply rotated to move the arm 88 outwards and simultaneously to move the arms 105 outward but at half the rate of movement of the arm 88 and the changed pressure on the roller 85 will automatically compensate either the motor 62 or 70 to achieve this varied diameter of the helical tube. This assembly therefore makes it possible to produce a progressively tapered tube, or a tube varying substantially in diameter along its length according to a required program.

In normal operation, in the production of constant diameter tubing, both the drive rollers 55 and 56 turn at approximately the same speed and preferably with the main drive roller 55 turning at a constant speed. The roller 56 may be varied in speed under the control of the size sensing roller 85 to correct any change in diameter of the helical convolution being produced.

Any increase in the helical diameter causes the size sensing roller to rise from its normal position, which through electronic control means varies the speed of the motor 70 driving the roller 56, with the roller 56 then increasing in speed. This increase in speed of the roller 56 in relation to the roller 55 reduces the diameter of the helix being produced until the size-sensing roller 85 has returned to its normal position.

If the size-sensing roller drops below its normal position, the roller 56 will reduce in speed until the helix has caused the sensing roller to return to its normal position.

To change the diameter of the helixal tube, the horizontal sensing rollers 104 are moved into position relative to the axial centre line of the helical tube. This change may be made at any time either before or during the time that the helix is being produced.

As the rollers 104 are connected to move with the roller 85 but through half the distance when the hand wheel 100 is rotated the sensing roller 85 will be positioned to vary the speed of the roller 56 and the diameter of the helical convolution which is being produced will change, thus permitting the diameter of a tube to be progressively varied as it is produced either to produce a tube having a constant taper along its length or a tube of varying dimension along its length.

As the tube being formed rotates in any of the foregoing embodiments support means are provided such as the frame bars 106 having on them anti-friction roller 109. To provide for adjustment of the helix angle, the bars 106 and roller 109 may be suitably mounted for movement as by a "Y"-shaped assembly carried by a base mounted on a monorail (not shown).

Figure 15:
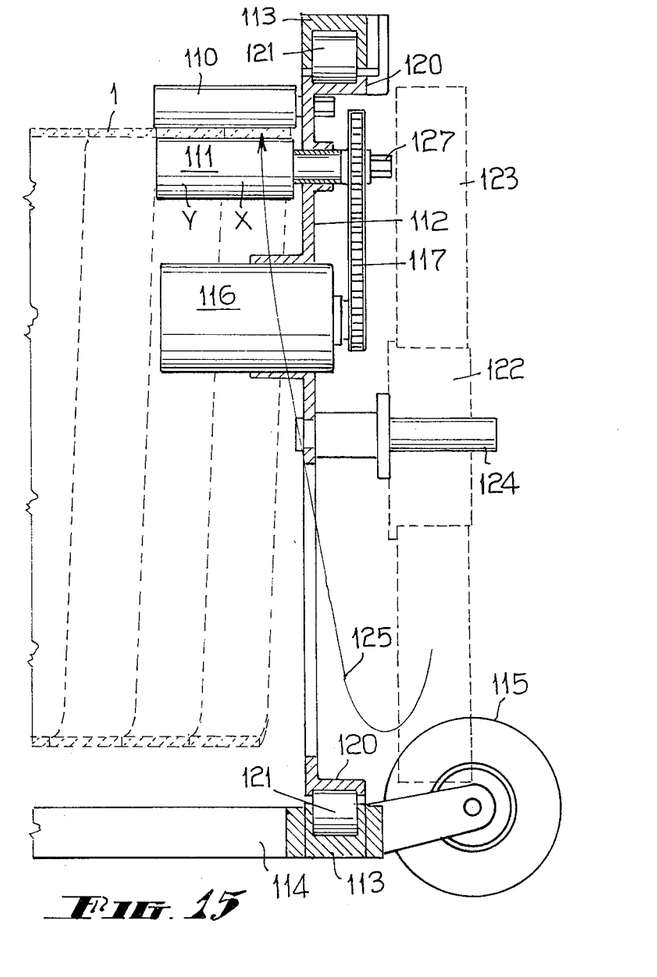
FIG. 15 is a somewhat schematic view of a machine with a similar function to that shown in part in FIGS. 7 and 8 but showing how the feed and joining rollers can move circularly to allow the tube being formed to remain stationary.

In the form shown in FIG. 15 the joining roller 110, which corresponds to the roller 30 of FIG. 7, and the feed roller 111, which corresponds to the compound feed roller 33 of FIG. 7 are carried on a frame 112 which can rotate in a ring 113 on a chassis 114 provided with transport wheels 115, the frame 112 also carrying a motor 116 which drives the feed roller 111 through a chain 117. In this embodiment a strip 1 is fed between the rollers 110 and 111 and when a first convolution has been formed it is held against rotating in any suitable manner and if drive continues the rollers 110 and 111 force the frame 112 around in the ring, and the chassis 114 is moved forward as the helical tube is formed.

To allow the rotation the frame 112 has on its circumference a track 120 engaged by rollers 121 rotatably carried in the ring 113 fixed to the chassis 114.

As in operation the frame 112 rotates as the drive roller 111 drives the frame around by reaction of the helical tube which is prevented from rotating. The strip 1 must be fed to between the rollers 110 and 111 and this can be achieved by mounting a spool 122 with a coil of strip 123 on it (shown in dotted lines) on a support shaft 124 on the frame 112 the strip can be unwound and by following generally the path of the arrow 125 will feed to between the rollers 110 and 111.

The drive roller 111 is of similar construction to that shown in FIG. 7 for the roller 33, that is it has a resilient portion X and a resilient but expandable portion Y which is tensioned by the nut 127 to determine the required differential drive to produce the required diameter of the helically formed tube.

This form of device is particularly suitable for large tubes which, for instance, must be embedded in the ground, and can be formed by allowing the chassis 114 to move forward as the tube is manufactured.

This principle can, of course, be applied in various ways but the machine must be shaped to allow free feed to the rollers 110 and 111.

The electrical feed to the motor 116 can be taken to it in any suitable manner.

The machine described in this Figure may be changed for hand operation by simply mounting the spindles of the rollers 110 and 111 on an arm secured to a spindle on a support frame at the axis of the tube to be formed and rotating the roller 111 by a hand crank whereupon the rollers will drive the arm around the helical convolution of the tube.

Obviously the roller 111 can be replaced by the two-roller assembly shown particularly in FIG. 9 rather than the embodiments shown which uses a single variable-diameter roller.

So far as the sealing of the helical joint in the tube is concerned, this can be achieved by engaging the rib 27 in the groove 26 and locking it by forcing the locking rib 29 behind the expanded end of an adjacent rib 28 of the strip 1, but a sealant can be applied to the joint through, for instance, a tube T as shown in FIG. 1. Sealant could be pre-applied to the strip or a sealing compound could be used, and if the helical tube is to be strengthened a strengthening member such as a wire or a high tensile ribbon could be fed in with the strip, for instance, at the area designated 131 in FIGS. 4 and 5 or at any of the areas 132 between the ribs when these are present.

We claim:

1. The method of forming tubes from strip which comprises:
   (a) feeding forward a strip having a complementary rib and groove spaced apart on the said strip to each extend longitudinally on the said strip and oppositely facing on the said strip,
   (b) guiding the said strip into a helical configuration with the said rib in register with the said groove after one revolution of the said helix to overlap edge portions of the said strip,
   (c) pressing together the said overlapping parts of the said strip while maintaining a differential feed pressure between that part of the said strip being fed and at least that part of said strip being guided into said helical configuration, (d) the said differential pressure is achieved by feeding the said strip to between a joining roller and a pressure roller, engaging one of the said rollers with one side of the strip to drive the strip forward longitudinally while preventing the other of said rollers from substantially opposing the driving force of said one roller, guiding the said strip beyond the said rollers into a helical convolution to bring the said rib in line with the said groove at the said rollers, also engaging a part of the helical convolution of the strip between the said rollers, and continuing to drive the said strip forward while pressing the said rib into said groove while maintaining said differential feed pressure on the part of said strip being fed and that part of the strip forming the helical convolution to cause the said strip to be joined to the said convolution, and (e) the said strip and the said part of said convolution are engaged between the said rollers but said one roller is divided to have two sections, one to engage the said part of said strip being fed, and the other to engage the said part of said convolution, and driving the sections of the divided roller at different rates of rotation whereby to achieve the differential feed pressure.

2. The method of claim 1 wherein the rate of rotation of at least one of the said sections of the said divided roller is variable and varying the said rate of rotation to produce a different diameter in the helical tube being formed.

3. The method of claim 2 wherein the rate of rotation of said at least one of said sections is controlled by engaging a sensing member on at least the said helical convolution, and causing the said rate of rotation to be varied by the said sensing member.

4. The method of forming tubes from strip which comprises:
(a) feeding forward a strip having a complementary rib and groove spaced apart on the said strip to each extend longitudinally on the said strip and oppositely facing on the said strip,
(b) guiding the said strip into a helical configuration with the said rib in register with the said groove after one revolution of the said helix to overlap edge portions of the said strip,
(c) pressing together the said overlapping parts of the said strip while maintaining a differential feed pressure between that part of the said strip being fed and at least that part of said strip being guided into said helical configuration,
(d) the said differential pressure is achieved by feeding the said strip to between a joining roller and a pressure roller, engaging one of the said rollers with one side of the strip to drive the strip forward longitudinally while preventing the other of said rollers from substantially opposing the driving force of said one roller, guiding the said strip beyond the said rollers into a helical convolution to bring the said rib in line with the said groove at the said rollers, also engaging a part of the helical convolution of the strip between the said rollers, and continuing to drive the said strip forward while pressing the said rib into said groove while maintaining said differential feed pressure on the part of said strip being fed and that part of the strip forming the helical convolution to cause the said strip to be joined to the said convolution, and (e) the said strip and the said part of said convolution are engaged between the said rollers and at least said one roller has different diameters at the said part of said strip being fed and at the said part of said convolution whereby to achieve the differential feed pressure.

5. The method of claim 4 or wherein said rollers are free to move circularly about the axis of the tube being formed, whereby the helical convolution is held against rotation about its longitudinal axis and the said rollers are driven around the said longitudinal axis.

6. A method of forming a tube comprising:
feeding a strip which has a rib and a complementary groove extending longitudinally on the strip;
guiding the strip being fed into a helical convolution with a first part of the strip being fed entering said convolution and a second part of the strip leaving said convolution and with the rib of one of said parts being in registry with the groove of the other of said parts;
forcing the rib and groove which are in registry together to place the rib in the groove while applying a differential driving force to one side of said first part and to one side of said second part of said strip which tends to move said first and second parts of said strip forward at different rates of motion to join said first and second parts of said strip together and while preventing the application of a substantial force to the opposite sides of the first and second parts which would oppose said differential driving force; and
continuing said steps of feeding, guiding and forcing to form a tube having a plurality of said helical convolutions.

7. A method as defined in claim 6 wherein said step of feeding includes gripping said strip between rollers and including rotating the rollers generally about the axis of the tube being formed.

8. A method as defined in claim 6 wherein the application of said driving force to said first and second parts of said strip moves said first and second parts forward at different rates of motion whereby said parts slip relative to each other in the joint between them.

9. A method as defined in claim 6 wherein said one side of said first part and said one side of said second part face in the same direction.

10. A method as defined in claim 6 wherein said one side of said first part and said one side of said second part of said strip are each relatively smooth.

11. A method as defined in claim 6 wherein said one side of said first part and said one side of said second part are both on the inside of the convolution.

12. A method as defined in claim 6 including providing roller means on said one sides of said first and second parts of said strip and first and second rollers on said opposite sides of the first and second parts of said strip, respectively, with said roller means and said first and second rollers being positioned adjacent the location where the strip being fed enters said convolution and said second part of the strip leaves said convolution and said differential driving force is applied by said roller means.

13. A method as defined in claim 12 wherein said roller means has first and second sections which engage said first and second parts of said strip, respectively, without substantially engaging said second and first parts of said strip, respectively.

14. A method as defined in claim 13 wherein said roller means has first and second sections for engaging said first and second parts, respectively, of said strip with one of said sections having a larger diameter than the other of said sections and said step of applying includes rotating said first and second sections at substantially the same angular velocity.

15. A method as defined in claim 12 wherein said roller means has first and second sections for engaging said first and second parts, respectively, of the strip and said step of applying a differential driving force includes driving one of said sections at a greater angular velocity than the other of said sections.

16. A method as defined in claim 12 wherein said roller means includes first and second sections for engaging the first and second parts, respectively, of the strip with at least one of said sections being compressible to vary the diameter of said one section, and including compressing said one section of said roller means to increase its diameter.

17. A method as defined in claim 12 wherein said first and second rollers are allowed to free wheel.

18. A method of forming a tube comprising:
    feeding a strip which has a rib and a complementary groove extending longitudinally on the strip;
    guiding the strip being fed into a helical convolution with a first part of the strip being fed entering said convolution and a second part of the strip leaving said convolution and with the rib one of said parts being in registry with the groove of the other of said parts;
    providing a pressure roller on one side of said parts and a joining roller on the other side of said parts;
    engaging both of said parts with both of said rollers;
    forcing the rib and groove which are in registry together using said rollers to place the rib in the groove; and
    rotating said pressure roller while leaving said joining roller undriven to apply a differential driving force to said first and second parts of said strip which tends to move said first and second parts of said strip forward at different rates of motion.

19. A method of forming a tube from a strip wherein the strip has a rib and a complementary groove extending longitudinally thereon, said method comprising:
    providing a series of guide rollers and a joining roller with said rollers being arranged in a configuration around the periphery of the tube to be formed;
    feeding said strip forward from a location outside of said configuration using strip driving means outside said configuration into contact with said rollers to bend said strip along a helical path to form a helical convolution and to bring said rib and said groove into registry at said joining roller with the bending of the strip into a helical convolution inducing stress in the helical convolution;
    using at least some of the stress induced in said helical convolution to force the helical convolution into contact with said joining roller and to force said rib into said groove at said joining roller to thereby form a seam which joins the convolution to the strip; and
    continuing said steps of feeding and using to form the tube.

20. A method as defined in claim 19 wherein said step of providing includes providing a first plurality of said rollers between a first location where such seam is formed and a second location spaced at least 180° around the tube being formed from said first location and contacting said seam with each of said first plurality of rollers.

21. A method as defined in claim 19 including contacting said seam with at least one of said rollers at a second location spaced at least 180° beyond the first location in the direction in which the tube is being formed.

22. A method as defined in claim 19 wherein said step of providing is carried out such that said configuration is generally circular.

23. A method as defined in claim 19 wherein the axis of the tube being formed and the axes of said rollers are non-parallel.

24. A method as defined in claim 19 wherein the axes of at least some of said rollers are substantially perpendicular to the long dimension of the strip at the location where the strip is engaged by such rollers.

25. A method as defined in claim 19 wherein said configuration is generally circular and including contacting said seam with at least one of said rollers at a second location which is over 180° beyond the first location in the direction in which the tube is being formed and wherein the axis of the tube being formed and the axes of at least some of said guide rollers are non-parallel.

26. A method of forming a tube from a strip as defined in claim 19 wherein the rib is forced into the groove to form said seam solely by said stress.

* * * * *